United States Patent [19]

Lowery et al.

[11] 4,059,176
[45] Nov. 22, 1977

[54] UNITARY SPRING CLUTCH BRAKE AND ACTUATOR ASSEMBLY

[75] Inventors: Robert D. Lowery, Willowick; Donald J. Baxter, South Euclid; Joseph R. Lawn, Brecksville, all of Ohio

[73] Assignee: Marquette Metal Products Company, Cleveland, Ohio

[21] Appl. No.: 689,035

[22] Filed: May 24, 1976

[51] Int. Cl.² .................. F16D 67/02; F16D 41/02
[52] U.S. Cl. ......................... 192/12 BA; 192/17 D; 192/26
[58] Field of Search ............... 192/12 BA, 17 D, 26

[56] References Cited

U.S. PATENT DOCUMENTS

| | | | |
|---|---|---|---|
| 2,652,134 | 9/1953 | Montooth | 192/17 D |
| 3,373,851 | 3/1968 | Baer | 192/12 BA |
| 3,451,512 | 6/1969 | Sacchini et al. | 192/12 BA |
| 3,521,730 | 7/1970 | Weatherby | 192/12 BA |
| 3,545,580 | 12/1970 | Baer | 192/26 |
| 3,559,781 | 2/1971 | Brunelle | 192/12 BA |
| 3,987,880 | 10/1976 | Letz et al. | 192/12 BA |

Primary Examiner—Benjamin W. Wyche
Attorney, Agent, or Firm—Arthur Frederick; Victor D. Behn

[57] ABSTRACT

The unitary spring clutch and actuator assembly has a spring clutch subassembly comprising a shaft for supporting two axially spaced input and output drums which are surrounded by a helically wound spring, one end of which is connected to a control sleeve or collar surrounding the spring. The collar has a stop element which coacts with the actuator subassembly to control rotation of the collar and hence engagement or disengagement of the spring from the input and output drums. The actuator subassembly includes a fixed frame for supporting an electro-magnetic control device which is adapted to engage and disengage from the stop element. The spring clutch and actuator subassemblies are secured together at one end portion of the shaft, which projects through an opening in the frame, and by a retaining member constructed and arranged to engage the tubular shaft and frame. A bearing is interposed between the shaft and frame to facilitate rotation of the shaft relative to the fixed frame.

4 Claims, 6 Drawing Figures

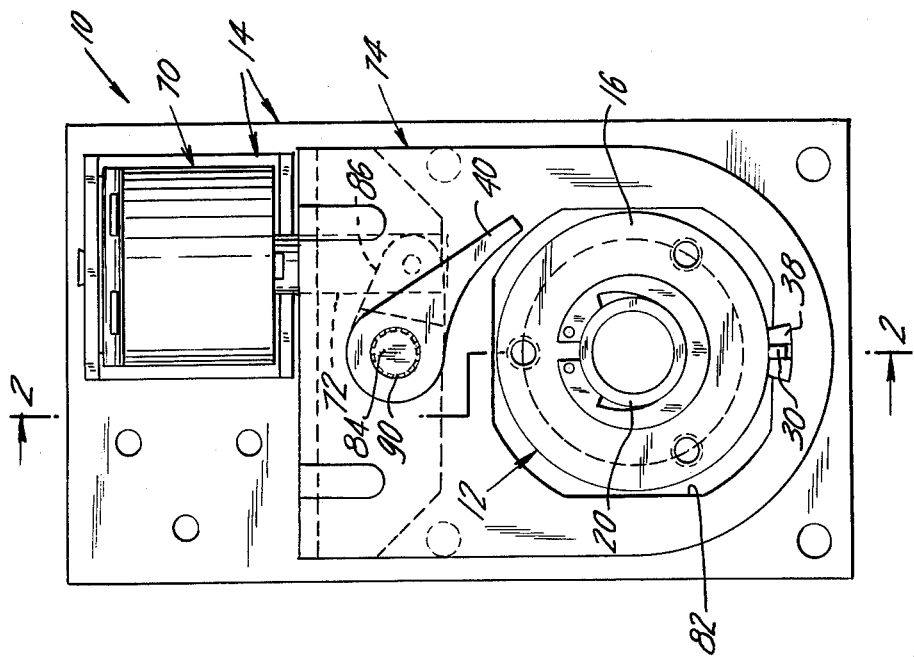
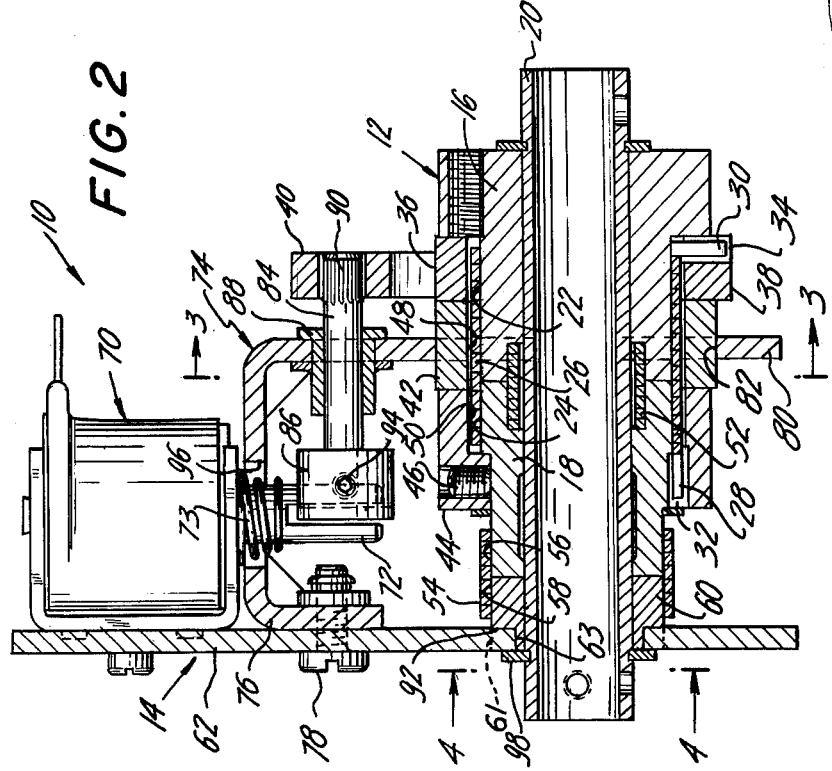

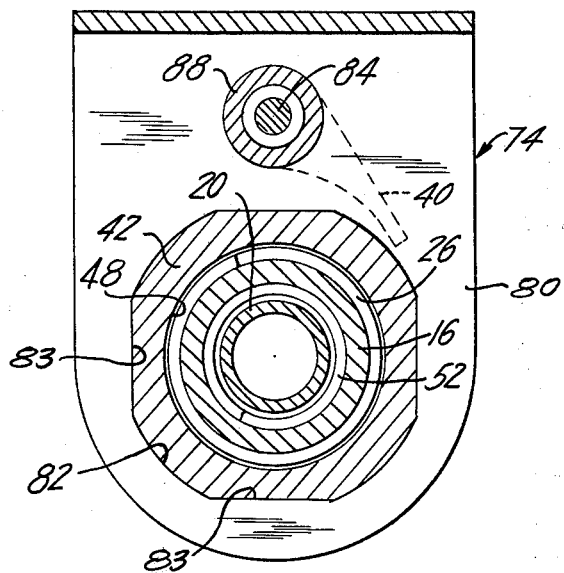
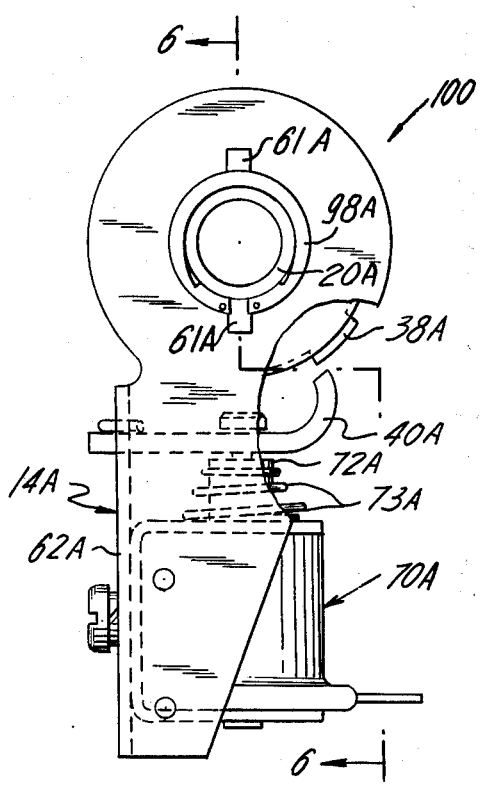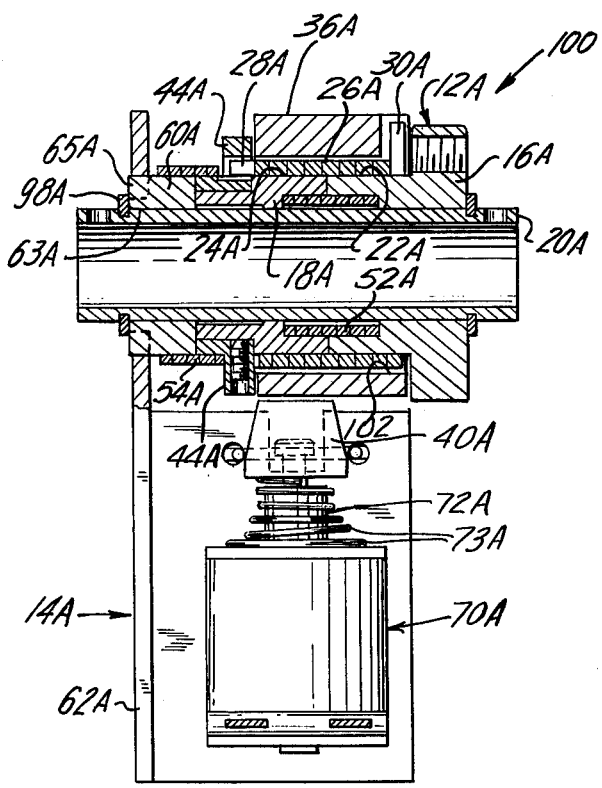

UNITARY SPRING CLUTCH BRAKE AND ACTUATOR ASSEMBLY

This invention relates to power actuated spring clutches and more particularly to a spring clutch having a control sleeve or collar, the rotation of which is controlled by a power unit such as a fluid piston-cylinder mechanism or electro-magnetic device.

BACKGROUND OF THE INVENTION

In spring clutches controlled by solenoid actuators such as exemplified in the U.S. Pat. No. 3,373,851, dated Mar. 19, 1968 to Baer, the spring clutches and actuators are factory assembled into a unitary structure. While this type of unitary spring clutch and actuator assembly relieves the purchaser of the initial expense and responsibility of assembling the spring clutch and actuator, the purchaser still has the problem of a major disassembly and reassembly of the unit when repairs to the clutch subassembly is required. The present invention minimizes this latter problem.

Accordingly, an object of this invention is to provide a unitary spring clutch and actuator assembly in which the spring clutch and actuator subassemblies can be simply and easily separated and reunited for repair or replacement purposes.

SUMMARY

Now, therefore, the present invention contemplates a unitary spring clutch and actuator assembly comprising a spring clutch subassembly and an actuator subassembly connected together into a unitary structure.

The spring clutch subassembly comprises a shaft for supporting two coaxially spaced input and output drums which are surrounded by a helically wound main spring, one end of which is connected to a control sleeve or collar surrounding the spring. The opposite end of the main spring is connected to one of the drums. The control sleeve is provided with a stop element which coacts with the actuator subassembly to control rotation of the control sleeve and, hence, engagement and disengagement of the spring clutch.

The actuator subassembly comprises a power actuator means, as for example, a piston-cylinder fluid motor or an electro-magnetic device, such as a solenoid, which is supported on a stationary frame. It also includes stop means controlled by the power actuator means to coact with the stop element of the control sleeve to effect engagement and disengagement of the spring clutch.

The spring clutch and actuator subassemblies are constructed and arranged to slidably engage each other and are secured in such engaged position by a detachable retaining member, as for example, a snap ring or split ring, that engages the shaft and frame.

In a narrower aspect of the present invention, a bearing is interposed between the frame and shaft to facilitate rotation of the shaft relative to the frame. Also, the bearing may be of the sleeve-type with a portion of the peripheral surface serving as a braking surface for a backstop spring which functions, on disengagement of the clutch, to prevent reverse rotation of the output drum. Such backstop springs are disclosed in the U.S. patents to Weatherby, U.S. Pat. No. 3,521,730, dated July 28, 1970; Baer, U.S. Pat. No. 3,425,526, dated Feb. 4, 1969; and Sacchini et al, U.S. Pat. No. 3,451,512, dated June 24, 1969.

In a still narrower aspect of the invention, the spring clutch subassembly may also include an overrunning spring interconnecting the input and output drums to prevent the output drum from running ahead of the input drum, such overrunning springs being disclosed in U.S. patent to Wagner, U.S. Pat. No. 3,337,015, dated Aug. 22, 1967 and the aforesaid U.S. patent to Sacchini et al.

In a further narrower aspect of this invention, the helical main spring also serves, on disengagement, as a brake by bearing against a fixed surface which, in one embodiment hereof, is rotatively fixed by the frame and, in the other embodiment is the inner surface of the control sleeve. The braking action is to prevent, upon disengagement, coasting of the output drum and to stop the latter quickly after clutch disengagement.

In one embodiment, the frame is U-shaped with one of the legs of the frame having an opening to receive therethrough, a portion of the spring clutch subassembly. The frame opening and the outer peripheral configuration of the braking element forming a braking surface are complementarily shaped so that the frame fixes the braking element against rotation but permits axial relative movement during assembly or disassembly of the spring clutch and actuator subassemblies.

In another embodiment of the invention, the frame has a single leg with integral distal portion extending at right angles adjacent to the spring clutch subassembly on which is mounted the power actuator means.

BRIEF DESCRIPTION OF THE DRAWINGS

The invention will now be more fully understood from the following detailed description thereof when considered in connection with the accompanying drawing wherein two embodiments of the invention are illustrated by way of example and in which:

FIG. 1 is an end elevational view of a unitary spring clutch and actuator assembly, according to a first embodiment of this invention;

FIG. 2 is a longitudinal sectional view taken substantially along line 2—2 of FIG. 1;

FIGS. 3 and 4 are transverse sectional views taken substantially along lines 3—3 and 4—4 of FIG. 2;

FIG. 5 is an end elevational view, with parts broken away for illustration purposes, of a unitary spring clutch and actuator assembly, according to a second embodiment of this invention; and FIG. 6 is a cross-sectional view taken along line 6—6 of FIG. 5.

DESCRIPTION OF THE PREFERRED EMBODIMENTS

Now, referring to the drawings and more specifically to FIGS. 1 to 3, the reference number 10 generally designates a unitary spring clutch and actuator assembly, according to a first embodiment of this invention. The unitary spring clutch and actuator assembly comprises two major subassemblies, namely, spring clutch subassembly 12 and actuator subassembly 14.

Spring Clutch Subassembly

The spring clutch subassembly 12 comprises an input drum 16 and an output drum 18 supported in coaxial relationship to each other by a tubular shaft 20. The input drum 16 is connected to a suitable source of rotary power (not shown) by torque means (not shown) such as a gear or pulley wheel connected to input drum 16. The input drum 16 is mounted on tubular shaft 20 for rotation relative to the latter and has an outer peripheral clutching surface 22 which is coextensive with an outer peripheral clutching surface 24 on output drum 18. Overlying and surrounding clutching surfaces 22 and 24 is a helically wound main spring 26.

Main Spring

The main spring 26 has, at its opposite ends, offset end portions or tangs 28 and 30. The tang 28 projects into an axially extending opening 32 in output drum 18 while tang 30 projects into a groove 34 in a control sleeve or collar 36. The main spring 26 is dimensioned so that the coils of the spring adjacent input drum 16 are in interference fit with clutching surface 22 of the input drum. The hand or the direction of the helix in relation to the direction of rotation of input drum 16 is such that the coils of main spring 26 wrap-down or tend to contract around the input and output drums 16 and 18 to thus effect transmission of torque from input drum 16 to output drum 18. In this torque transmitting operative condition, control collar 36 rotates along with the input and output drum 16 and 18 and output shaft 20 to which output drum 18 is rotatively secured.

Control Collar

The control collar 36, as best shown in FIG. 2, has a radially projecting element 38 which coacts with a pivotal stop lever 40 of actuator subassembly 14 to control rotation of the control collar. When stop lever 40 is actuated into the path of rotation of stop element 38 and the latter abuts the lever to arrest rotation of collar 36, the tang 30 of main spring 26 is held against rotation to thereby cause the coils of spring 26 to expand and release their grip on clutching surface 22 of input drum 16. This disengagement of main spring 26 interrupts transmission of torque to output drum 18 and output shaft 20.

Brake Collar

To stop output drum 18 upon such disengagement, a brake collar 42 is disposed adjacent control collar 36 and a sleeve 44 which is secured by a set screw 46 to and forms part of output drum 18. The brake collar 42 has an inner peripheral surface 48 surrounding main spring 26 in close spaced relationship with the latter and against which the expanding coils of main spring 26 bear along with engaging, upon expansion, an inner annular surface 50 of sleeve 44. Thus, with the spring engaging brake surface 48 and surface 50, continued inertial rotation of output drum 18 and output shaft 20 is prevented.

Overrunning Spring

The spring clutch subassembly 12 also may include a spring 52 disposed in an annular recess spanning the cross-over space between input and output drums 16 and 18. This spring 52 functions, in the engaged operative condition, to prevent overrunning of output drum 18 and output shaft 20.

Backstop Spring

A further feature, which may be a part of spring clutch subassembly 12, is a backstop spring 54 which surrounds coextensively arranged peripheral surfaces 56 and 58. The surface 56 forms part of output drum 18 while surface 58 is part of a rotatively fixed sleeve bearing 60 which is slidably receivable in a frame 62, the latter forming part of actuator subassembly 14. To fix sleeve bearing 60 against rotation, the bearing is provided, as best shown in FIG. 4, with a plurality of radially extending lugs or splines 61 which are receivable in complementary notches in an opening 63 in frame 62. The spring 54 is in interference fit with surface 58 of sleeve bearing 60 and is so wound, in relation to the direction of rotation of output drum 18, that surface 56 of the output drum overrides the spring in the engaged or torque transmitting operative condition. In the disengaged operative condition and upon any rotation of output drum 18 in the direction opposite to that during torque transmission, the spring coils contract to grip surface 56 and stop such reverse rotation of output drum 18.

Actuator Subassembly

The actuator subassembly 14 comprises, in addition to frame 62 and stop lever 40, a power actuator means 70 mounted on frame 62. The power actuator means 70 is shown as a solenoid having a reciprocable core or plunger 72. The plunger 72 is biased by a spring 73 in a retracted position. However, instead of a solenoid as shown, it may be any suitable motion producing device, such as a pressurized fluid motor, or more specifically, a piston-cylinder mechanism, connected to selectively pivot stop lever 40.

Frame

The frame 62, in this embodiment, includes a generally inverted U-shaped bracket 74 which is secured at a shorter leg 76 by a bolt 78 to a plate element of the frame. The bracket 74 is so dimensioned and secured to the plate element that its longer leg 80 is positioned in a plane containing brake collar 42. As best shown in FIGS. 2 and 3, longer leg 80 has an irregular shaped opening 82, having as for example flats 83, which configuration and size is such as to slidably receive therein brake collar 42. The complementary configuration of opening 82 and the outer peripheral surface of brake collar 42 is such as to prevent rotative movement of brake collar 42 relative to frame 62 yet permit relative axial movement when spring clutch subassembly 12 and actuator subassembly 14 are to be joined or separated as will be more fully explained hereinafter.

Power Actuator Means

The power actuator means 70, shown as a solenoid in the drawings, is connected to stop lever 40 by way of a shaft 84 and a bell crank 86. The shaft 84 is rotatively supported by a sleeve bearing 88 secured in leg 80 of bracket 74 and is rotatively connected to stop lever 40 by a press fit (serrations or splines 90 being formed on the end portion of the shaft for such purpose) or by other suitable means. The bell crank 86 is pivotally connected at one end to plunger 72 of the solenoid and, at the opposite end, is secured to shaft 84 by a pin or set screw 94. A hole 96 is provided in the bracket 74 to pass plunger 72 of the solenoid therethrough.

The operation of actuator subassembly 14 herein described is as follows. When the solenoid is de-energized, spring 73 forces plunger 72 to extend from the solenoid. This movement rotates bell crank 86 which, in turn, rotates shaft 84. Rotation of shaft 84 carries stop lever 40 into the path of rotation of stop element 38 of control collar 36 so that stop element 38 abuts stop lever 40 and thereby holds control collar 36 against rotation. As previously stated, when rotation of control collar 36 is arrested, spring 26 disengages from input drum 16 to interrupt torque transmission. When the solenoid is again energized, plunger 72 is retracted against the force of spring 73 and, in such retraction movement, rotates through bell crank 86 and shaft 84, stop lever 40 out of the path of stop element 38 to again allow the control collar to rotate and spring 26 to re-engage input drum 16.

Assembly

The spring clutch and actuator assembly 10 is assembled by inserting its spring clutch subassembly 12 along its axis into opening 63 and 82 in frame 62 of its actuator subassembly 14. The sleeve bearing 60 passes into opening 63 with the splines 61 aligned with the notches in the periphery of opening 63 (see FIG. 4), while brake collar 42 passes into, and is positioned within, opening 82. The spring clutch subassembly 12 is secured in the actuator frame 14 by a suitable detachable retaining means such as a split ring or, as shown, a snap ring 98 receivable in an annulus in shaft 20 and abutting frame 62, the latter being thereby held against arcuate shoulders 92 of sleeve bearing 60. To disassemble or separate spring clutch subassembly 12 from actuator subassembly 14 for purposes of inspection, repair, or replacement, snap ring 98 is removed from the annulus in shaft 20 and the entire spring clutch subassembly 12 is then axially withdrawn from openings 63 and 82.

Second Embodiment

In FIGS. 5 and 6 is shown a spring clutch and actuator assembly 100, according to a second embodiment of this invention. The spring clutch and actuator assembly 100 differs from spring clutch and actuator assembly 10 shown in FIGS. 1 to 4, in that the frame is different and the spring clutch subassembly and power actuator means have been modified so that the control collar also serves a braking function. However, the spring clutch and actuator assemblies 10 and 100 are sufficiently similar that parts of spring clutch actuator assembly 100 similar to parts of spring clutch actuator assembly 10 will be designated by the same number with the suffix A added thereto.

Alternate Spring Clutch Subassembly

The spring clutch subassembly 12A comprises an input drum 16A and an output drum 18A disposed coaxially relative to each other with output drum 18A rotatively connected to an output shaft 20A. A main spring 26A surrounds the peripheral clutching surfaces 22A and 24A of the respective input and output drums 16A and 18A. One end of spring 26A is connected by a tang 28A to output drum 18A, via a sleeve 44A, while the opposite end is connected by a tang 30A to a control sleeve or collar 36A. The control collar 36A has a stop element 38A (see FIG. 5) which coacts with a pivotal lever 40A to control rotation of control collar 36A. A spring 52A similar to spring 52 of the embodiment shown in FIGS. 1 to 4, is provided to prevent output drum 18A from overrunning input drum 16A. Also a sleeve bearing 60A, similar to sleeve bearing 60, is rotatively fixed in a frame 62A and provides a peripheral surface which is gripped by a back-stopping spring 54A when output drum 18A rotatively moves in a direction reverse to that of the torque transmitting direction, after disengagement.

Alternate Actuator Subassembly

The actuator subassembly 14A comprises a frame 62A which is generally L-shaped rather than generally of inverted U-shape as is frame 62 of actuator subassembly 14, shown in FIG. 2. A power actuator means 70A, such as a solenoid shown in the drawings, in secured to one leg of the frame while the spring clutch subassembly 12A is secured in a hole 63A in the other leg of the frame. The solenoid includes a plunger 72A which is biased outwardly of the housing by a spring 73A. The stop lever 40A is pivotally connected at one end to frame 62A and is secured to the distal end of plunger 72A so that, upon energization and de-energization of the solenoid, stop lever 40A is actuated into and out of the path of travel of stop element 38A of control collar 36A.

The spring clutch subassembly 12A is secured to actuator subassembly 14A by inserting sleeve bearing 60A into opening 63A in frame 62A with the lugs or splines 65A of sleeve bearing 60A rotatively interlocked with complementary notches in the periphery of opening 63A. A suitable retainer means 98A, such as split ring or snap ring, is provided to secure the entire spring clutch subassembly to frame 62A.

Operation

The spring clutch and actuator assembly functions as a normally disengaged clutch when the solenoid is de-energized. With input drum 16A being driven by a suitable source of rotary power (not shown) and upon energization of the solenoid, plunger 72A is retracted against the force of spring 73A and thus pivots stop lever 40A out of engagement with stop element 38A. This frees control collar 36A for rotation and allows the coils of spring 26A to wrap-down upon clutching surface 22A of input drum 16A and effect torque transmission. Upon de-energization of the solenoid, plunger 72A is extended under the urging of spring 73A thereby pivoting stop lever 40A into the path of stop element 38A. Upon abutment of stop element 38A against stop lever 40A, rotation of control collar 36A is arrested to thus cause the coils of main spring 26A to expand and release its grip on clutching surface 22A of input drum 16. Substantially simultaneously, with the expanding and release of spring coils from clutching surface 22A, the coils engage the inner peripheral surface 102 of the arrested control collar 36A, thus connecting output drum 18A, via sleeve 44A, with a fixed structure and thereby stopping the rotation of output drum 18A. The control collar 36A, therefore, serves the dual purpose of controlling engagement and disengagement of main spring and providing an output drum braking surface.

The overrunning spring 52A and back-stopping spring 54A function in the same manner as described with respect to overrunning and backstopping springs 52 and 54 of spring clutch subassembly 12 shown in FIGS. 1 to 4.

The spring clutch subassembly 12A and actuator subassembly 14A can be quickly and easily separated for purposes of inspection and/or repair by merely disconnecting snap ring 98A from the annulus in shaft 20A and axially moving spring clutch subassembly 12A out of openings 63A in frame 62A. Reassembly of the same or new spring clutch subassembly 12A and actuator subassembly 14 can be readily made by merely inserting sleeve bearing 60A into opening 63A and reinserting snap ring 98A.

It is believed now readily apparent that the present invention provides a novel unitary spring clutch and actuator assembly in which the spring clutch subassembly and actuator subassembly may be quickly and easily separated for maintenance purposes without the need for special tools and without any major disassembly.

Although two embodiments of the invention have been illustrated and described in detail, it is to be expressly understood that the invention is not limited thereto. Various changes can be made in the arrangement of parts without departure from the spirit and scope of the invention as the same will now be understood by those skilled in the art.

What is claimed is:

1. A unitary spring clutch and actuator assembly comprising:
   a. an actuator subassembly having
      a-1. a frame;
      a-2. a power actuator means including a movable stop member mounted on said frame;
      a-3. said frame having a first and second opening therein;
   b. a spring clutch subassembly having
      b-1. a rotatable shaft;
      b-2. input and output drums mounted for rotation about the axis of said shaft and with one of said drums being connected to said rotatable shaft;
      b-3. a helically wound mainspring coaxial with said input and output drums to transmit torque from the input drum to the output drum;
      b-4. a control collar connected to said mainspring and having a stop element to be selectively engaged and disengaged from said stop member;
      b-5. a brake collar surrounding the mainspring and disposed adjacent the control collar and having an inner peripheral surface against which the mainspring bears for braking;
      b-6. said brake collar having an outer peripheral surface of irregular contour;
      b-7. said second opening having a peripheral contour complementary to said peripheral brake surface and of a size to slidably receive said brake collar therein and hold the latter against rotation;
      b-8. said shaft having a portion thereof extending axially beyond the end of at least one of the drums and receivable in said first opening in the frame; and
   c. detachable retaining means coacting with said shaft and the frame for securing the spring clutch subassembly to the frame and thus provide a unitary assembly.

2. the apparatus of claim 1 wherein said frame is generally of U-shaped configuration with said first opening disposed in one leg thereof and the second opening is formed in the other leg in axial alignment with said first opening.

3. A unitary spring clutch and actuator assembly comprising:
   a. an actuator subassembly having
      a-1. a U-shaped frame;
      a-2. a power actuator means including a movable stop member mounted on said frame;
      a-3. a first opening in one leg of said frame having an irregular peripheral contour;
      a-4. a second opening in the other leg of said frame disposed in axial alignment with said first opening;
      a-5. said second opening having an irregular peripheral contour;
   b. a spring clutch subassembly having
      b-1. an output shaft;
      b-2. coaxially disposed input and output drums mounted for rotation about the axis of the shaft and with said output drum connected to the output shaft for conjoined rotation;
      b-3. a helically wound main spring surrounding said input and output drums and, in one operative position, engaging the input and output drums so as to provide transmission of torque from the input drum to the output drum;
      b-4. a control collar surrounding at least a portion of the main spring and connected to said main spring to effect rotation of the control collar and upon arrest of the rotation of the control collar, disengagement of the spring;
      b-5. the control collar having a stop element rotatable with the control collar and engageable by said stop member in one operative position to arrest rotation of the control collar and in another operative position to permit rotation of the control collar;
      b-6. a bearing associated with the output shaft and having a peripheral portion of a contour complementary to the first opening in the frame and of a dimension to be slidably receivable in said first opening so as to be held against rotation while supporting the output shaft for rotation;
      b-7. a brake collar surrounding the main spring and adjacent the control collar;
      b-8. said brake collar having an inner peripheral surface engageable by the mainspring upon disengagement and its expansion;
      b-9. said brake collar having an outer peripheral surface of a contour complementary to the contour of said second opening in the frame so as to be axially, slidably receivable in said second opening and held against rotation by the frame; and
   c. detachable retaining means coacting with the output shaft and the frame for securing the spring clutch subassembly to the frame with the bearing in said first frame opening.

4. The apparatus of claim 3 wherein said bearing and said output drum have co-extensive peripheral surfaces and a coil spring embraces those surfaces to prevent reverse rotation of the output drum after disengagement of the main spring.

* * * * *